United States Patent [19]

Rikuta

[11] 4,250,915
[45] Feb. 17, 1981

[54] AUTOMATIC CONTROLLING VALVE FOR MAINTAINING THE RATE OF FLUID FLOW AT A CONSTANT VALUE

[76] Inventor: Sotokazu Rikuta, 24-7, 2-chome, Koun-cho, Maebashi-shi, Gunma-ken, Japan, 371

[21] Appl. No.: 57,470

[22] Filed: Jul. 13, 1979

Related U.S. Application Data

[62] Division of Ser. No. 871,565, Jan. 23, 1978, Pat. No. 4,210,171.

[30] Foreign Application Priority Data

Nov. 17, 1977 [JP] Japan .................. 52-138354

[51] Int. Cl.³ ............................................. G05D 7/01
[52] U.S. Cl. .................................... 137/501; 137/503
[58] Field of Search ................................. 137/501, 503

[56] References Cited

U.S. PATENT DOCUMENTS

| | | | |
|---|---|---|---|
| 2,608,209 | 8/1952 | Bryant | 137/501 |
| 2,803,264 | 8/1957 | Griswold | 137/501 |
| 3,028,876 | 4/1962 | Gratzmuller | 137/501 |
| 3,428,080 | 2/1969 | Brown | 137/501 |

FOREIGN PATENT DOCUMENTS 1120637 12/1961 Fed. Rep. of Germany ........... 137/501

Primary Examiner—Robert G. Nilson
Attorney, Agent, or Firm—Jordan and Hamburg

[57] ABSTRACT

An automatic fluid control valve for maintaining a substantially constant fluid flow rate includes a partition wall within a valve casing between a fluid inlet and a fluid outlet. A restriction adjusting member is mounted movably in the valve casing and includes a tapered end movable relative to a valve port in the partition wall to define a restricted passageway for fluids with the adjacent walls of the valve port. A valve stem is movable within the casing and has a valve thereon cooperable with the valve port to regulate the flow of fluids therethrough in response to changes in fluid pressure differential. A diaphragm is operatively connected to the valve stem and separates a region within the valve casing into a pair of pressure-differential chambers, and a flow passage is formed in the casing communicating one pressure-differential chamber with the inlet chamber, the other pressure-differential chamber communicating with the downstream side of the valve port.

2 Claims, 9 Drawing Figures

AUTOMATIC CONTROLLING VALVE FOR MAINTAINING THE RATE OF FLUID FLOW AT A CONSTANT VALUE

This is a division of application Ser. No. 871,565, filed Jan. 23, 1978 now U.S. Pat. No. 4,210,171.

BACKGROUND OF THE INVENTION

The present invention relates to a constant-flow fluid controlling valve for automatically controlling the rate of flow of fluid passing therethrough to thereby maintain a constant rate of fluid flow even when fluctuations in fluid pressure take place at either the inlet or outlet side of the valve.

In a known constant-flow fluid controlling valves of the diaphragm or piston type, when fluid pressure on the inlet side increases or when fluid pressure on the outlet side decreases, increasing the rate of fluid flow through a restriction installed in a flow passage on the inlet side and also increasing the pressure differential across the restriction, the diaphragm or piston moves, moving a valve stem connected thereto to thereby reduce the rate of flow of fluid passing through the controlling valve. When fluid pressures are well balanced as described above, the following equation holds:

$$(P_1 - P_2) \times S = F - W$$

where
- $P_1$ = pressure on the upstream side of the restriction.
- $P_2$ = pressure on the downstream side of the restriction.
- S = effective area of the diaphragm.
- F = pulling force of a spring exerting on the valve stem.
- W = sum of all the weights of an inner valve and the parts attached thereto in fluid.

The above equation can be changed into the equation $$P_1 - P_2 = \frac{F - W}{S} \dots = \text{a constant value.}$$

Since the pressure differential created across the restriction is held constant, the controlling valve is capable of sending the fluid at a constant rate of fluid flow.

However, the difference in magnitude between the upward and downward forces acting on the inner valve must be nullified, irrespective of the values for the pressures $P_1$ and $P_2$, in order that the above equation should be made to hold.

In other words, it is essential that a constant-flow fluid controlling valve should be designed in such a way that friction between a valve stem and the parts guiding it is reduced to a minimum and also that an inner valve is not moved up and down in a vertical line as result of pressures received directly from the fluid.

The valve of the present invention is an automatic flow controlling valve embodying such conception and thus maintaining a constant rate of fluid flow by utilizing the energy itself of the fluid flowing therethrough.

SUMMARY OF THE INVENTION

The valve according one embodiment of to the present invention is an automatic constant-flow fluid controlling valve having a valve casing, a partition wall formed therewithin to partition the valve casing into an inlet-side chamber and an outlet-side chamber, a valve port made in the horizontal part of the partition wall, a valve stem movable relative to the valve port and fitted with a valve plug adapted to open and close the valve port. A diaphragm is mounted on the top of the valve stem. An inlet-side flow passage of the valve is divided by a restriction into a pre-chamber and a post-chamber. A lower pressure-differential chamber separated from the inlet-side chamber by a valve-plug guiding member is formed between the diaphragm and the valve plug; a part of the fluid from the post-chamber of the restriction is caused to flow through a strainer into the lower pressure-differential chamber; and the fluid pressures acting on the upper and lower surfaces of the valve plug are made to be equal in magnitude and opposite to each other.

BRIEF DESCRIPTION OF THE DRAWINGS

In the drawings, the same reference characters are employed to designate identical parts.

DESCRIPTION OF THE PREFERRED EMBODIMENTS

Embodiment 1

Figures 1, 2:
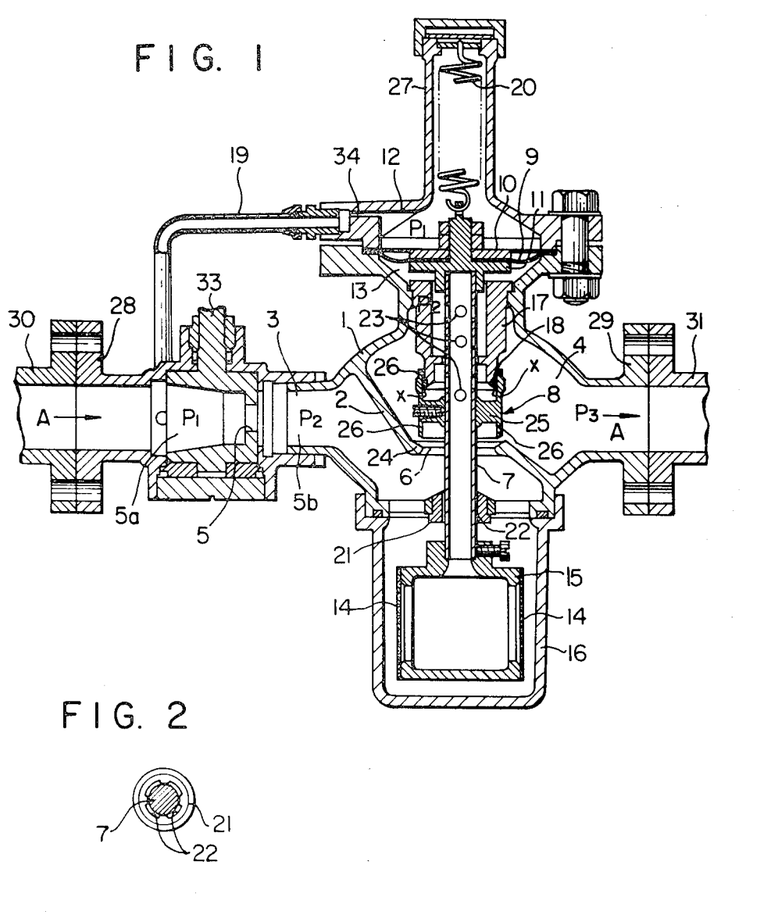
FIG. 1 is a vertical cross-sectional view of an automatic flow controlling valve according to one embodiment of the invention.
FIG. 2 is a top view of the guide bushing 21 shown in FIG. 1.
Figure 3:
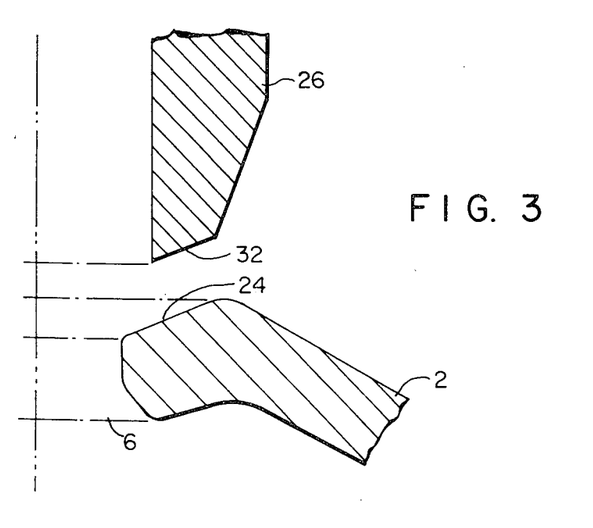
FIG. 3 is an enlarged vertical cross-sectional view of a valve seat 24 and a lower annular or circumferential edge of the valve plug 8 shown in FIG. 1.

With reference now to FIGS. 1, 2, 3, and 4 of the drawings there is illustrated a valve casing 1 which is divided by a partition wall 2 therewithin into an inlet side chamber 3 and an outlet side chamber 4. A restriction 5 is provided in the inlet side flow passage to partition it into a pre-chamber 5a and post-chamber 5b the setting of the area for fluid flow through the restriction 5 being adjusted by means of an adjusting member 33. A valve port 6 is formed in the horizontal part of the partition wall 2, the upper periphery of the valve port 6 constituting a valve seat 24 having an inwardly inclined surface as shown in FIG. 3. The valve port 6 is opened and closed by the respective separation and contacting of the tapered edge 32 of a cylindrical valve plug 8 from and with the valve seat 24. A hollow valve stem 7 extends through the valve port 6 in the direction of the vertical axis of the valve casing 1. The cylindrical valve plug 8 serving to open and close the valve port 6 is fixedly mounted on the valve stem 7 by means of a transverse support plate 25. The transverse support plate 25 is dimensioned in such a way that the axial fluid-pressure receiving areas of its upper and lower surfaces are equal to each other. The cylindrical valve plug 8 also is dimensioned in such a way that the axial fluid-pressure receiving areas of the upper and lower annular edges of a cylindrical member 26 are equal to each other. A diaphragm 9 partitions a pressure-differential chamber into an upper pressure-differential chamber 12 and a lower pressure-differential chamber 13 and is secured to the upper end of the valve stem 7 by means of retainers 10 and 11, the upper and lower pressure-differential chambers 12 and 13 respectively receiving back pressure and positive pressure. The valve stem 7 is fitted at its lower end with a strainer 15 having filtering medium 14. The strainer 15 is housed in an easily attachable and detachable strainer case 16, the strainer case 16 being joined by threading to the valve casing 1 at its bottom circular end. It is preferred to employ a transparent strainer case because the inside can then be seen through the strainer case from the outside. A valve-plug guiding member 17 fitted at its lower part with a sliding-contact ring 18 is joined by threading on the upper inner peripheral surface of the valve casing 1, thus separating the lower pressure-differential chamber 13 from the outlet-side chamber 4. The inner peripheral surface of the valve plug 8 is slidable on the sliding-contact ring 18. Since the pressure $P_2$ of the fluid flowing from the strainer 15 through the hollow valve stem 7 and a plurality of communicating holes 23 into the valve-plug guiding member 17 and the lower pressure-differential chamber 13 is greater than the fluid pressure $P_3$ within the outlet-side chamber 4, the fluid leaks along a sliding-contact surface X and through a clearance space between the valve-plug guiding member 17 and the valve plug 8 into the outlet side chamber 4. During this time, because the fluid entering the valve-plug guiding member 17 and the lower pressure-differential chamber 13 has been filtered through the strainer 15 before flowing into the hollow valve stem, there is no possibility of hindering the valve plug 8 from moving up and down smoothly due to the introduction of impurities into the sliding contact surface X. The pre-chamber 5a of the restriction 5 and the upper pressure-differential chamber 12 communicate with each other through a branch flow-passage 19. A spring case 27 positioned coaxially over the valve stem 7 forms with the diaphragm 9 the upper pressure-differential chamber 12. A spring 20 is mounted coaxially within the spring case 27 between the upper end thereof and the top of the valve stem 7. A guide bushing 21 serves to guide the lower part of the valve stem 7. As shown in FIG. 2, a plurality of concave recesses 22 are formed in the inner periphery of the guide bushing 21 so that the area of the sliding-contact surface between the bushing and the valve stem 7 may be reduced. The guide bushing 21 is so constructed to reduce frictional resistance with the valve stem 7 and also to prevent the introduction of impurities therebetween. The numerals 30 and 31 respectively designate inlet and discharge pipes and the numerals 28 and 29 respectively designate for flanges attachment to the inlet pipe 30 and the discharge pipe 31. The, the action of the controlling valve of this embodiment will now be described. The major portion of the fluid A which has reached the inlet 3 flows sequentially through pre-chamber 5a, restriction 5, post-chamber 5b, inlet side chamber 3, and the valve port 6 into the outlet side chamber 4 and is discharged through the outlet 4. Concurrently, a part of the fluid which has entered pre-chamber 5a flows through the branch flow-passage 19 into the upper pressure-differential chamber 12 and a part of the fluid which has entered the pre-chamber 5b flows through the strainer 15, the valve stem 7, and the communicating holes 23 into the lower pressure-differential chamber 13. If the fluid pressures within the pre- and post-chambers 5a and 5b respectively are represented by $P_1$ and $P_2$, then the back pressure within the upper pressure-differential chamber 12 becomes equal to the fluid pressure $P_1$ because the upper pressure-differential chamber 12 communicates with the prechamber 5a. The fluid pressure within the lower pressure-differential chamber 13 has the pressure $P_2$ because the fluid pressure inside the lower pressure-differential chamber 13 is the same as that inside the post-chamber 5b. Therefore, when fluctuations in pressure differential take place across the restriction 5, pressure differentials of equal value are generated between the upper and lower pressure-differential chambers 12 and 13. The diaphragm 9 operates, to move the valve stem 7 upwardly or downwardly to automatically regulate the rate of fluid flow through the valve in accordance with such fluctuations in pressure differential. During this time the upper and lower surfaces of the transverse support plate 25 has applied thereto the same fluid pressure as $P_2$ inside the lower pressure-differential chamber 13 and the same fluid pressure $P_2$ inside the post-chamber 5b, the fluid pressures applied on the upper and lower surfaces of the transverse support plate 25 thus compensating each other and thereby cancelling out. If the fluid pressure inside the outlet side chamber 4 is represented by $P_3$, fluid pressure $P_3$ is exerted axially to each of the circumferential upper and lower edges of the cylindrical member 26 of the valve plug 8, these fluid pressures of $P_3$ secure to compensate each other and cancel out. Consequently the valve plug 8 is not at all influenced by fluctuations in flow rate and fluid pressure, and only the up and down movement of the diaphragm 9 caused by fluctuations in the pressure differential of $(P_1-P_2)$ is transmitted by means of the valve stem 7 to the valve plug 8, thereby permitting it to adjust the degree of opening of the valve to automatically regulate the rate of fluid flow therethrough.

As described above, in the controlling valve of this embodiment, the rate of the fluid flow can be held nearly constant by adjusting the degree of opening of the restriction 5 to a desired point by means of an adjusting member 33 provided with a scale. The fluid pressures acting on the valve plug 8 compensate one another and cancel out owing to the operation of the diaphragm 9 caused by the action of the positive and back pressures thereon as described above which permits an accurate supply of fluids at a constant rate of flow. Further the adverse effect of impurities in the fluids is prevented by removing the impurities through the strainer 15 at the sacrifice of a small reduction in the degree of accuracy caused by the change in effective area depending on the up and down movement of the diaphragm 9. There is no possibility of introducing impurities between the inner peripheral surface of the valve plug 8 and the sliding-contact surface of the slide guide-ring 18 positioned on the peripheral surface of the valve-plug guiding member 17, the fluid entering the lower pressure-differential chamber 13 having been filtered through the strainer 15 before being permitted to flow into the inner valve. The dust and dregs having been removed, the valve plug 8 can move up and down smoothly and surely in a vertical line, to effectively close the valve port 6 and to be trouble free. Furthermore, because the strainer 15 is covered with the easily attachable and detachable strainer case 16, cleaning and exchanging it can be easily carried out. The materials for the slide guide-ring 18 and the guide bushing 21 are selected from those that can reduce the coefficient of friction between the sliding-contact surfaces thereby enabling the degree of accuracy of the valve stem 7 and the valve plug 8 which move up and down to increase.

Since the upper periphery of the valve port 6, constituting the valve seat 24, is tapered on its inner surface as shown in FIG. 3, stream lines are uninterrupted by virtue of the taper throughout the cross-sectional area of the intermediate flow passage formed between the valve seat 24 and a lower tapered edge 32 of the cylindrical member 26, independently of the speed of the fluid or whether the lower annular or circumferential edge of the cylindrical member 26 is square or is tapered as shown in FIG. 3. Therefore the balance between axial fluid pressures acting on the valve plug 8 can be always maintained accurately, the operation of the valve plug 8 caused by the action of the diaphragm 9 can be effectively performed, and positive closing of the valve port 6 can be expected when the lower tapered edge 32 of the cylindrical member 26 comes into close contact with the tapered valve seat 24, thereby providing a controlling valve of a high degree of accuracy.

Figure 4:
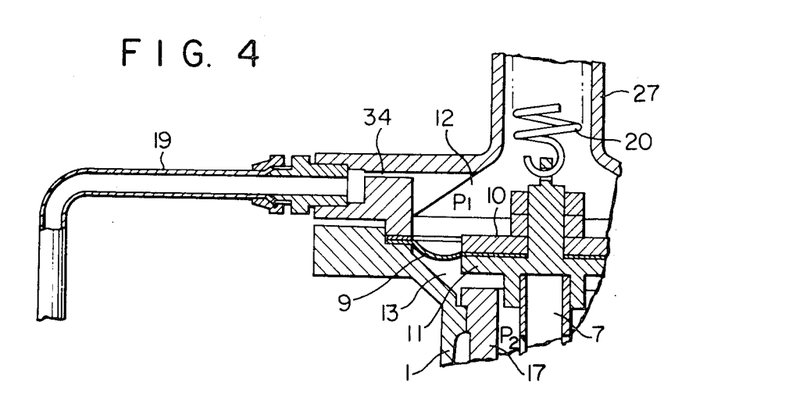
FIG. 4 is an enlarged vertical cross-sectional view of the narrow passage 34 shown in FIG. 1.

In this embodiment, when a part of the branch flow-passage 19 leading to the upper-differential chamber 12 is formed into a narrow fluid passage 34 as shown in FIG. 4, then the problem of a hunting phenomenon of diaphragm 9 caused by fluctuations in fluid pressure can be avoided.

That is to say, since the rate of flow of a fluid flowing into and from the upper pressure-differential chamber 12 is reduced by interposing the narrow flow passage 34 between the branch flow-passage 19 and the upper pressure-differential chamber 12, for example, even when a sharp increase in fluid pressure occurs in the pre-chamber 5a and is transmitted through the branch flow-passage 19 to the upper pressure-differential chamber 12, the fluid does not flow rapidly at a high flow-rate according to the increased fluid pressure into the upper pressure-differential chamber 12, but instead flows thereinto at a low flow-rate. The resultant gentle application of fluid pressure on the diaphragm 9 causes it to operate slowly or to move downwardly and slowly. Hence, even if fluctuations in fluid pressure occur on the inlet side 3 and are transmitted to the upper pressure-differential chamber 12, the gentle operation of the diaphragm 9 eliminates the possibility of hunting moving the valve plug 8 upwardly and downwardly with stability and certainty to automatically regulate the rate of fluid flow through the valve very effectively.

Embodiment 2

The fluid flow controlling valve of this embodiment has a modified construction and includes a cylindrical valve plug serving to open and close a valve port positioned as to move up and down in a vertical line freely; no difference in magnitude existing between the axial opposite forces acting on the valve plug irrespective of fluctuations in the flow rate and pressure of the fluid.

Figure 5:
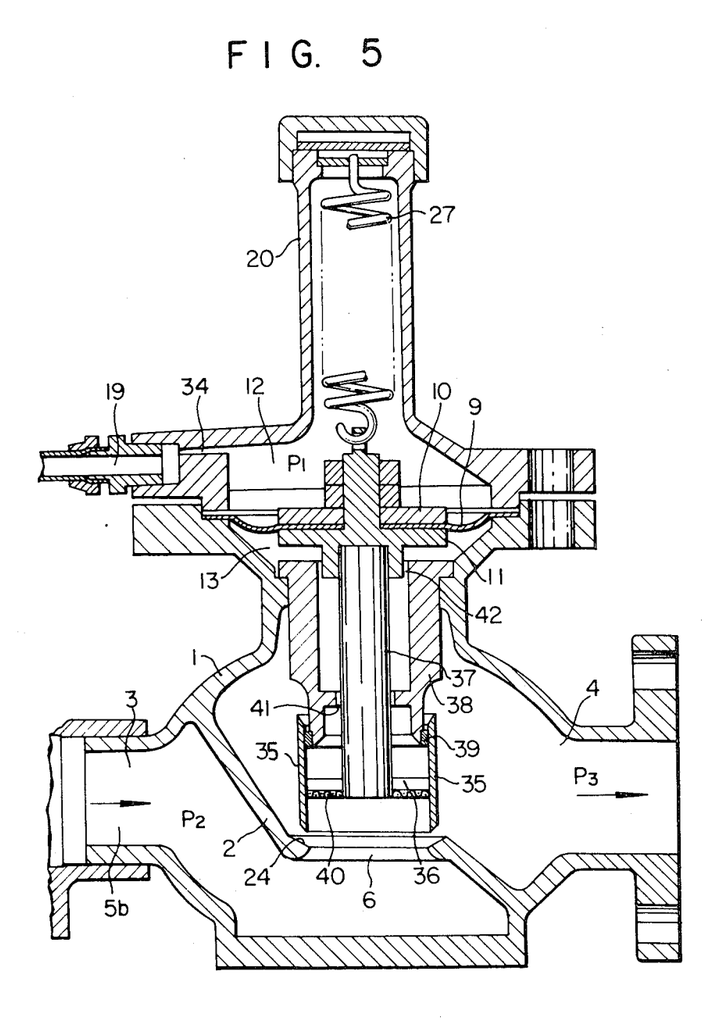
FIG. 5 is a vertical cross-sectional view of an automatic flow controlling valve having a modified construction, but also embodying the features of the invention.

Referring to FIG. 5 there is described a valve casing 1 made into a flat bottomed valve casing by omitting strainer 15 and strainer case 16 shown in FIG. 1. A valve port 6 is made in the horizontal part of a partition wall 2 provided within the valve casing 1. Over the valve port 6 there is positioned a cylindrical valve plug 35 for opening and closing the valve port 6. The valve plug 35 is secured by means of a horizontal spider 36 to a vertical valve stem 37, the vertical valve stem 37 having its axis common to the valve casing 1 and the valve port 6. Filtering medium 40 such as wire gauze is placed between each of the legs of the horizontal spider 36. The valve plug 35 is dimensioned in such a way that the areas of the fluid pressure-receiving surfaces of the upper and lower edges of its peripheral wall are equal to each other. A diaphragm 9 is provided within a pressure-differential chamber and is mounted on the top of the valve stem 37 by means of metallic retainers 10 and 11, partitioning the pressure-differential chamber into an upper pressure-differential chamber 12 and a lower pressure-differential chamber 13. A cylindrical, valve-plug guiding member 38 is joined by threading to the upper inner peripheral surface of the valve casing 1, separating the lower pressure-differential chamber 13 from an outlet-side chamber 4 and also having on its lower outer peripheral surface a slide guide-ring 39 facilitating the sliding of the inner peripheral surface of the valve plug 35 to freely thereon.

The action of the controlling valve of this embodiment will now be described. The major portion of the fluid which has reached inlet 3 flows through a pre-chamber 5a of a restriction 5, and as described in connection with FIG. 1, a post-chamber 5b. The fluid then flows through, an inlet side chamber 3, valve port 6, and an intermediate flow passage between the valve plug 35 and a valve seat 24 into an outlet side chamber for discharge 4. At this time, in the same manner as that of the preceding embodiment, some part of the fluid is introduced through a branch flow-passage 19 into the upper pressure-differential chamber 12. Part of the fluid is filtered through the filtering medium 40 positioned within the valve plug 35 and flows through an annular clearance 41 between the valve stem 37 and an internal flange of the valve-plug guiding member 38, and through an annular opening 42 between the metallic retainer 11 and the valve-plug guiding member 38 into the lower pressure-differential chamber 13. Hence the up and down movement of the diaphragm 9 is transmitted through the valve stem 37 to the valve plug 35 to regulate the rate of fluid flow through the valve in the same manner as described in connection with FIG. 1 in accordance with changes in the pressure differential $P_1$-$P_2$.

Embodiment 3

The construction of the fluid flow controlling valve of this embodiment is such that a variable-area orifice that adjusts the area of a flow passage for fluids passing therethrough is formed in place of the restriction 5 of the first and second embodiments on the inlet side of the valve. A branch flow passage leading to an upper pressure-differential chamber is provided on the upstream side of the orifice and a bypass leading to a lower pressure-differential chamber and a valve port are provided on the downstream side of the orifice. The variable orifice is set for the desired flow-rate before the rate of fluid flow is regulated by means of a valve plug having a diaphragm to be held constant.

Figure 6:
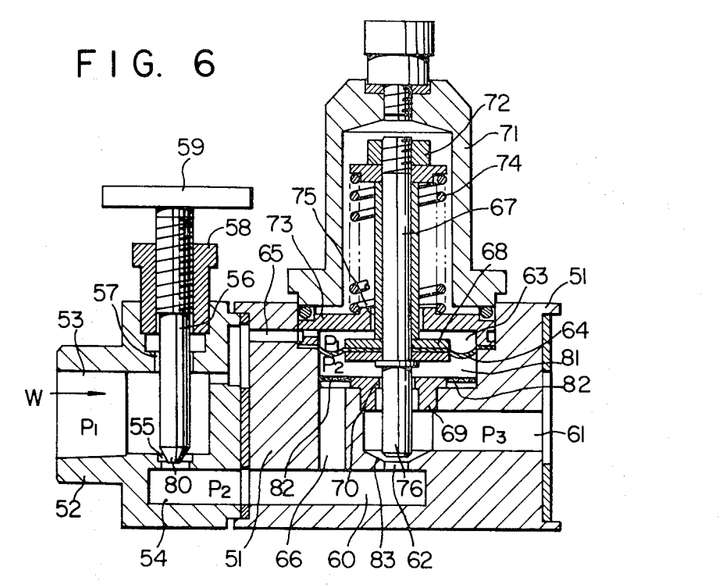
FIG. 6 is a vertical cross-sectional view of an automatic flow controlling valve having another modified construction, but also embodying the features of the invention.
Figure 7:
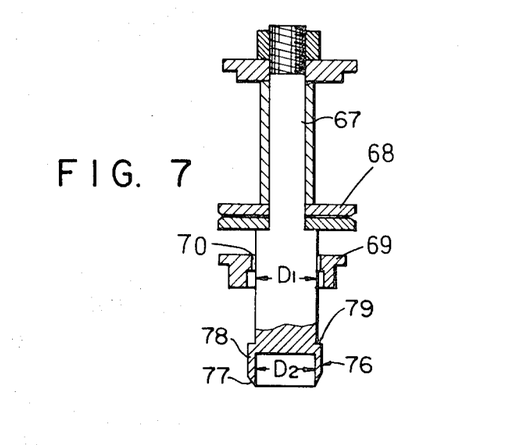
FIG. 7 is an enlarged vertical cross-sectional view of the valve stem 67 shown in FIG. 6.

Referring to FIGS. 6 and 7 there is shown a box-type valve casing 51 having on its inlet side an inlet conduit 52. The inlet conduit 52 has therewithin a flow passage 53 of larger diameter and a flow passage 54 of smaller diameter. The flow passage 53 and the flow passage 54 communicate with each other through a smaller-diameter hole or orifice 55. The lower tapered end 80 of an orifice adjusting stem 56 is cooperable with the hole 55. The orifice adjusting stem 56 is so positioned loosely through a larger-diameter hole 57 made in the side wall of the inlet conduit 52 as to slide therewithin. The upper threaded part of the stem 56 is engaged with threads on the inner peripheral surface of a guide bushing 58 fixedly positioned above the larger-diameter hole 57. An orifice adjusting mechanism is constructed in such a way that the lower tapered end 80 of the orifice adjusting stem 56 is made to contact with and separate from the smaller-diameter hole 55 by turning a handwheel 59 surmounting and integral with the stem 56 to adjust the cross-sectional flow area for through the orifice 55. The handwheel 59 has proximate thereto a dial and whereby the setting of the rate of flow can be adequately adjusted. The hole orifice 55 communicates through the flow passage 54 with a flow passage 60 formed in the lower thicker portion of the valve casing 51 and communicates further through a valve port 62 with an outlet-side flow passage 61. A pressure-differential chamber is formed within the upper part of valve casing 51 and is partitioned by a diaphragm 64 into an upper pressure-differential chamber 63 and a lower pressure-differential chamber 81. The upper pressure-differential chamber 63 communicates through a flow passage 65 with the flow passage 53 of larger diameter, namely the upstream side of the restriction orifice 55. The lower pressure-differential chamber 81 communicates through a flow passage 66 leading to the flow passage 60 with the flow passage 54 of smaller diameter, namely the downstream side of the restriction 55. The diaphragm 64 is secured to about the middle of a valve stem 67 by means of a metallic retainer 68, the lower part of the valve stem 67 being so inserted closely within a guide hole 70 formed in a valve guide 69 as to slide freely therewithin. The annular space between the outer circumferential surface of the flange of the valve guide 69 and the inner circumferential surface of the lower pressure-differential chamber 81 is filled with filtering medium 82 such as wire gauze, thus constituting a strainer. The upper part of the valve stem 67 is positioned coaxially within a spring case 71 surmounting the valve casing 51, and a spring retainer 72 is attached to the upper end of the valve stem 67. A coil spring 74 is so interposed compressively between the lower surface of the spring retainer 72 and the upper surface of a ceiling plate 73 of the valve casing 51 as to bias the valve stem 67 upwardly. The valve stem 67 is positioned loosely through a central hole 75 formed in the plate 73, the central hole 75 allowing the spring case 71 and the upper pressure-differential chamber 63 to communicate with each other. The lower part of the valve stem 67 constitutes a valve plug 76. The lower end of the valve plug 76 is opposed to a valve seat 83 formed in the upper periphery of the valve port 62, the valve port 62 being formed between the flow passage 60 and the outlet-side flow passage 61. The detailed structure of the valve plug 76 is shown in FIG. 7. The valve plug is formed into a cylindrical tube 78, the cylindrical tube 78 being closed at its upper end and opened at its lower end. The upper end of the cylindrical tube 78 constitutes a shoulder 79 and the lower end of the cylindrical tube 78 is shaped into an inclined surface 77. Further the cylindrical tube 78 is dimensioned to have its inner diameter $D_2$ made to be equal to the outer diameter $D_1$ of the valve stem 67.

The action of the controlling valve of this embodiment will now be described. When the area for fluid flow through the restriction 55 is adequately set by turning the handwheel 59 and a fluid W is allowed to enter the inlet conduit 52, then major portion of the fluid W flows through the restriction 55, the flow passages 54 and 60, and the valve port 62 into the outlet-side flow passage 61 and leaves through an outlet. The remainder of the fluid W flows through passages 65 and 66 into the upper and lower pressure-differential chambers 63 and 81 respectively. If fluid pressures on the upstream and downstream sides of the restriction 55 respectively are taken to be $P_1$ and $P_2$, then fluid pressures acting on the upper and lower surfaces of the diaphragm 64 respectively become $P_1$ and $P_2$. If pressure on the downstream side of the valve port 62 is taken to be $P_3$, then the pressures $P_2$, $P_3$, and $P_3$ respectively are applied on the ceiling surface, shoulder 79 and inclined circumferential surface 77 of the cylindrical tube 78 of the valve plug 76. When the rate of fluid flow through the inlet conduit 52 is increased or decreased, thereby increasing or decreasing the pressure $P_1$, the diaphragm 64 thus moves upwardly or downwardly, bringing the valve plug 76 close to or moving it away from the valve port 62 and also decreasing or increasing the cross-sectional area of the intermediate flow passage formed between the valve port 62 and the lower annular or circumferential edge of the cylindrical tube 78 of the valve plug 76 so that fluids passing through the valve will have a constant rate of fluid flow. When pressures are well balanced as described above, the following equation holds:

$$(P_1 - P_2) \times S = F - W$$

where
$P_1$=pressure on the upstream side of the restriction 55.
$P_2$=pressure on the downstream side of the restriction 55.
S=effective area of the diaphragm 64.
F=pulling force of the coil spring 74 exerted on the valve stem 67.
W=sum of all the weights of the inner valve and the parts attached thereto in the fluid W.

The above equation can be changed into the equation $$P_1 - P_2 = \frac{F - W}{S} \ldots\ldots = \text{a constant value.}$$

The rate Q of fluid flow through the restriction 55 can be expressed by the equation $$Q = aK\sqrt{2gH}$$

where
$H = {}_1 - P_2 =$ a constant value.
g=acceleration of gravity.
K=coefficient of exit.
a=cross-sectional fluid flow area through orifice or restriction 55.
This equation consequently gives $Q \propto a$.

Hence the rate Q of fluid flow is held constant unless the area for fluid flow through the restriction 55 is altered. Because a pressure as high as the fluid pressure $P_3$ is applied on the lower inclined peripheral surface 77 of the cylindrical tube 78 of the valve plug 76, pressures exerted on the upper and lower edges 79 and 77 of the cylindrical tube become nearly equal to each other. The valve plug 76 thus is not affected very much by fluctuations in pressure differential ($P_2$-$P_3$) created across the valve port 62, but is accurately driven substantially only by the displacement movement of the diaphragm 64 caused by fluctuations in pressure differential created across the restriction 55, which thereby permits the rate of fluid flow through the valve to be held constant.

Embodiment 4

The construction of the fluid flow controlling valve of this embodiment is such that a box-shaped partition wall defining on its one side an inlet is provided within a valve casing, partitioning it into an inlet-side chamber and an outlet-side chamber; a round hole and a valve port respectively are made in the upper and lower horizontal parts of the partition wall; a valve stem is positioned through the round hole and the valve port, the valve stem being fitted at its upper end with a diaphragm, having a valve plug to open and close the valve port and a pressure-receiving slide member slidable on the inner peripheral surface of a guide bushing inserted into the round hole. The valve stem is movable with the up and down movement of the diaphragm; the fluid passing through a radial clearance between the inner peripheral surface of the guide bushing and the outer peripheral surface of the pressure-receiving slide member after having been purified through a strainer before flowing into the radial clearance.

In the fluid flow controlling valve of this embodiment, because the fluid passing through the radial clearance between the outer peripheral surface of the pressure-receiving slide member and the inner peripheral surface of the guide bushing has been purified through the strainer before flowing into the radial clearance, the slide member can slide smoothly on the inner surface of the guide bushing, resulting in accurate automatic control.

Figure 8:
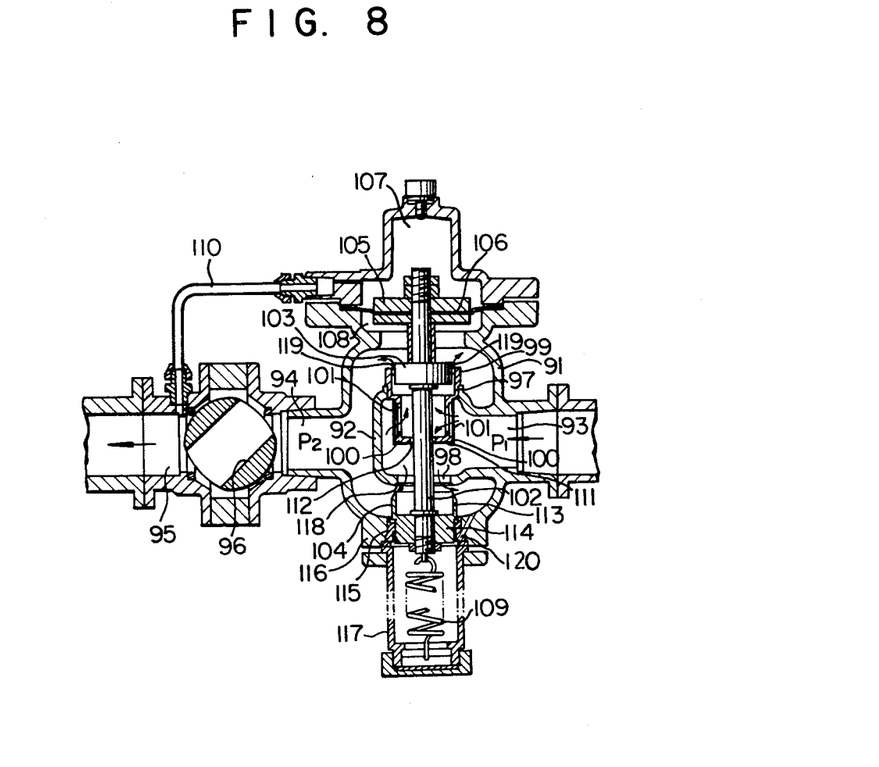
FIG. 8 is a vertical cross-sectional view of an automatic flow controlling valve having a further modified construction, but also embodying the features of the invention.

Referring to FIG. 8 there is shown a valve casing 91 provided therewithin with a box-shaped partition wall 92. The partition wall 92 is opened at its one side and partitions the valve casing 91 into an inlet-side chamber 93 and an outlet-side chamber 94. A restriction 96 that provides an adjustment of fluid flow rate therethrough is positioned in a flow passage between the outlet-side chamber 94 and an outlet 95. This setting can be adjusted by the use of an externally located dial (not shown in the drawing). A round hole 97 and a valve port 98 respectively are made in the upper and lower horizontal parts of the partition wall 92. A guide bushing 99 is screwed into the round hole 97. The guide bushing 99 is provided with an integral strainer 100. The strainer 100 has on its entire peripheral side a filtering medium 101 such as wire gauze and projects from the upper horizontal part of the partition wall 92 into the inlet-side chamber 93 and communicates therewith. A hole 112 is made in the bottom 111 of the strainer 100 and a valve stem 102 described later is positioned slidably therethrough. By making the diameter of the hole 112 adequately larger than the outer diameter of the valve stem 102, a sufficient radial clearance is allowed to exist between the hole 112 and the peripheral surface of the valve stem 102 so as to prevent the close contact thereof with the hole 112 as well as the clogging of the radial clearance by impurities, which might otherwise interfere with the up and down movement of the valve stem 102. Since the fluid which has entered the strainer 100 is allowed to flow in the directions of the arrow heads, there is no possibility of the fluid entering the strainer 100 through the radial clearance between the hole 112 and the peripheral surface of the valve stem 102; that is to say, the whole of the fluid entering the inside of the strainer 100 has been purified through the filtering medium 101 before flowing into the inside of the strainer 100.

The valve stem 102 extends slidably through the valve port 98 and through the hole 122 made in the strainer 100 and is provided with a pressure-receiving slide member 103 slidable on the inner peripheral surface of the guide bushing 99 and with a cylindrical inner valve 104 which is adapted to open and close the valve port 98. The upper half of the inner valve 104 constitutes a cylindrical valve plug 113 and is cooperable with a valve seat 118 of the valve port 98. The lower half of the inner valve 104 has a slightly smaller diameter than the outer diameter of the valve plug 113 and constitutes a mounting member 114 for attachment thereof to the valve stem 102. The peripheral surface of the mounting member 114 is slidable on the inner peripheral surface of a tube member 115 inserted into a round hole made in a bottom plate 116 of the valve casing 91. The mounting member 114 of the inner valve 104 and the pressure-receiving slide member 103 are dimensioned in such a way that all of the pressure-receiving areas of their respective upper and lower surfaces are equal to one another. A diaphragm 106 is secured to the upper end of the valve stem 102 by means of metallic retainer 105, thereby defining an upper pressure-differential chamber 107 and a lower pressure-differential chamber 108. The lower pressure-differential chamber 108 communicates with the outlet-side chamber 94. The upper extremity of a spring 109 housed within a spring case 117 is connected to the lower extremity of the valve stem 102, the valve stem 102 being biased downwardly by the spring 109. A branch flow-passage 110 is provided between the restriction 96 and outlet 95 to the upper pressure-differential chamber 107. The outlet-side chamber 94 and the spring case 117 communicate with each other through a branch flow-passage 120.

The action of the fluid flow controlling valve of this embodiment will now be described. The fluid which has reached the inlet flows through the inlet-side chamber 93 and valve port 98 into the outlet-side chamber 94 and leaves through the restriction 96 and through the outlet 95. A part of the fluid which has reached the outlet 95 is introduced through the branch flow-passage 110 into the upper pressure-differential chamber 107. When the rate of fluid flow increases on the inlet side and thereby the fluid pressure inside the outlet-side chamber 94 immediately upstream of the restriction 96 become higher than that at the outlet 95, moving the diaphragm 106, the valve stem 102, and the cylindrical inner valve 104 upwardly, the cross-sectional area of an intermediate fluids flow passage formed between the valve port 98 and the upper annular or circumferential edge of the cylindrical valve plug 113 is decreased so as to limit the rate of fluid flow through the valve. When the rate of fluid flow is limited in this manner and the pressure-differential between the upper and lower pressure-differential chambers 107 and 108 approaches zero, the diaphragm 106 resumes its position to automatically regulate the rate of fluid flow through the valve. If the pressures inside the inlet- and outlet-side chambers 93 and 94 respectively are represented by $P_1$ and $P_2$, then the pressure $P_1$ is applied on the upper surface of the mounting member 114 and also on the lower surface of the pressure-receiving slide member 103, and the pressure $P_2$ is applied on the lower surface of the mounting member 114 and also on the upper surface of the pressure-receiving slide member 103. Because the pressure-receiving areas of the upper surface of the mounting member 114 and the lower surface of the pressure-receiving slide member 103 are equal to each other, the pressures acting on them are equal in magnitude and opposite to each other, compensating and cancelling out each other. Similarly the pressures acting on the lower surface of the mounting member 114 and on the upper surface of the pressure-receiving slide member 103 are equal in magnitude and opposite to each other, compensating and cancelling out each other. Further, the pressure $P_2$ acts on the upper and lower circumferential edges of the cylindrical valve plug 113, compensating and cancelling out each other. Therefore all of the pressures which the cylindrical inner valve 104 and the pressure-receiving slide member 103 receive compensate and thereby cancel out one another. The cylindrical inner valve 104 thus is not influenced at all by fluctuations in flow rate and fluid pressure, and only the up and down movement of the diaphragm 106 is transmitted thereto by means of the valve stem 102. A single inner valve, namely the cylindrical inner valve 104 thus automatically regulates the rate of fluid flow through the valve effectively. Although pressure $P_1$ inside the inlet-side chamber 93 is higher than $P_2$ inside the outlet-side chamber and thereby 94 gives rise to the leakage of fluids from the higher-pressure side to the lower pressure-side through radial clearance 119 between the inner peripheral surface of the guide bushing 99 and the outer peripheral surface of the pressure-receiving slide member 103 in the directions of arrow heads, the purification of fluids through the filtering medium 101 results in no possibility of dust and dregs being introduced into the radial clearance 119, which permits the valve stem 102 to move smoothly up and down.

As described above, the fluid flow controlling valve of this embodiment is able to always supply fluids at a constant rate of flow and as results in accurate, effective, and trouble-free operation, the fluid entering the radial clearance 119 is purified through the strainer 100 before flowing into the guide bushing 99, which prevents the introduction of impurities into the radial clearance 119, reduces the friction between the pressure-receiving slide member 103 and the guide bushing 99, and thus permits the valve stem 102 to move smoothly up and down.

Embodiment 5

Figure 9:
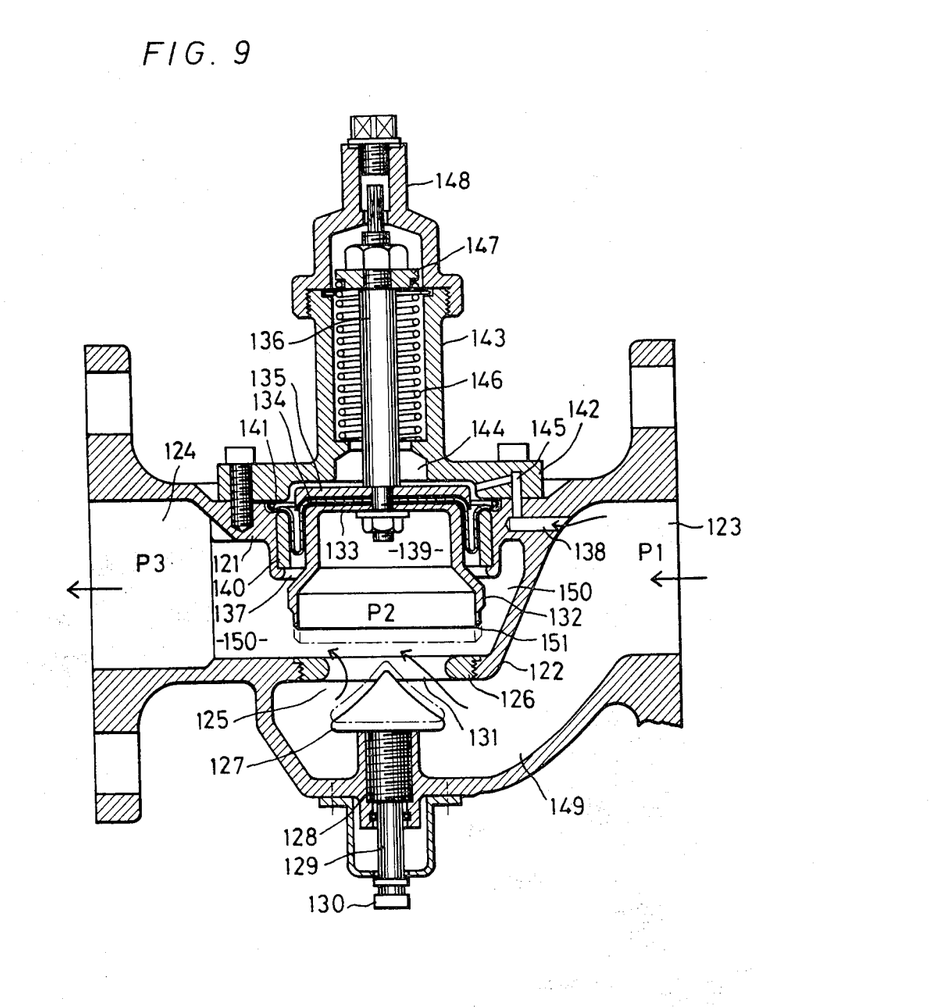
FIG. 9 is a vertical cross-sectional view of an autmoatic flow controlling valve having a still further modified construction, but also embodying the featrures of the invention.

Referring to FIG. 9 there is shown a valve casing 121 partitioned with a partition wall 122 therewithin into an inlet-side flow passage 123 and an outlet-side flow passage 124. A valve seat 126 is provided in the horizontal part of the partition wall 122. An umbrella-shaped restriction adjusting member 127 for adjusting the cross-sectional flow area of a restriction 125 cooperates with the valve seat 126 and when spaced therefrom forms therewith the restriction 125, constituting a first intermediate flow passage for fluids passing through the valve. Section 128 of the adjusting member 127 is joined by threading to the valve casing 121 in the bottom thereof. Handle 130 is integral with a shank 129 of the adjusting member 127. Turning of the handle causes the adjusting member 127 to move up and down relative to valve port 131 formed with the valve seat 126 so that the setting of the rate of fluid flow through the valve can be adjusted as desired. A chamber on the other side of the partition wall 122 constitutes a post-chamber 150 of the restriction 125. The lower annular or circumferential edge 151 of a valve plug 132 is cooperable with valve seat 126 provided in the horizontal part of the partition wall 122 and forms with the valve seat 126 a second intermediate flow passage for fluids passing through the valve. The valve plug 132 has a cylindrical form and is closed at its upper extremity by means of a top plate 133. The top plate 133 of the valve plug 132, a bellows-diaphragm 134, and a retainer plate 135 are secured together to the lower end of a valve stem 136 with the bellows-diaphragm 134 sandwiched between the retainer plate 135 and the top plate 133. The upper half of the valve plug 132 is positioned coaxially within a lower pressure-differential chamber 139 and is made to contact loosely with the inner surface of a liner 140 through the medium of the bellows-diaphragm 134. The peripheral part 141 of the bellows-diaphragm 134 is sandwiched between the upper peripheral part of the lower pressure-differential chamber 139 and the lower surface of a flange 142 of a spring case 143. The bellows-diaphragm 134 serves to separate the lower pressure-differential chamber 139 from an upper pressure-differential chamber 144 within the spring case 143. The inlet-side flow-passage 123 and the upper pressure-differential chamber 144 communicate with each other through a branch flow-passage 138 and a flow passage 145 in the flange 142. The valve stem 136 is positioned coaxially within the spring case 143 which is sealed with a bonnet 148 and is biased upwardly by a spring 146, the upper end of the spring 146 being secured to the valve stem 136 a short distance below the upper end thereof.

The action of the fluid flow controlling valve of this embodiment will now be described. The major portion of the fluid which has reached an inlet flows through the inlet-side flow passage 123, the pre-chamber 149 of the restriction 125, the restriction 125 the valve port 131 and through the second intermediate flow passage into the post-chamber 150 of the restriction 125 and leaves through the outlet-side flow passage 125 and through an outlet a part of the fluid in the inlet-side flow passage 123 is introduced through the branch flow-passage 138 and through the flow passage 145 formed in the flange 142 into the upper pressure-differential chamber 144. If fluid pressures in the inlet-side flow passage 123 and the post-chamber 150 of the restriction 125 respectively are taken to be $P_1$ and $P_2$, then the fluid pressures $P_1$ and $P_2$ respectively act within the upper pressure-differential chamber 144 and the lower pressure-differential chamber 139. Therefore, when fluctuations in pressure differential take place across the restriction 125, that is, the first intermediate flow passage 125, creating between the upper and lower pressure-differential chambers 144 and 139 pressure differentials equalling the values of the varying pressure differentials across the restriction 125, the bellows-diaphragm 134 thus operates, moving the valve stem 136 and the valve plug 132 upwardly and downwardly to automatically regulate the rate of flow of fluids passing through the valve port 131. At this time, If fluid pressure in the outlet-side flow passage 124 is taken to be $P_3$, the fluid pressure $P_3$ is applied on the inner surface and outer exposed surface of the valve plug 132 and also to the lower annular or circumferential edge 151 thereof. However, since the pressures acting on such parts compensate each other and thereby cancel out, the valve plug 132 is not affected by fluctuations in the rate of fluid flow and in fluid pressure only the up and down movement of the bellows-diaphragm 134 is transmitted through the valve stem 136 to the valve plug 132.

As described above, in the fluid flow controlling valve of this embodiment, the setting of the cross-sectional flow area of the restriction 125, that is, the first intermediate flow passage through the valve is adjusted to a desired value by means of the restriction adjusting member 127. The upward and downward motion of the valve plug 132 fitted with the bellows-diaphragm 134 is automatically caused by fluctuations in pressure differential across the restriction 125 to thereby maintain the rate of fluid flow through the valve at a prescribed value. The controlling valve of this embodiment has the advantages in that it is simple in mechanism and structure, high in the degree of accuracy of control, almost free from damage, easy to handle and also to assemble and disassemble.

What is claimed is:

1. An automatic fluid control valve for maintaining a substantially constant fluid flow rate comprising:

a valve casing having an inlet for the introduction of fluid thereinto and an outlet for discharge of fluid therefrom;

a partition wall within said casing between said fluid inlet and said fluid outlet, said partition wall having a valve port therein establishing communication between said fluid inlet and said fluid outlet, said partition wall including a horizontally extending portion in which said valve port is formed, said partition wall subdividing said valve casing into an inlet chamber and an outlet chamber located on the opposed sides thereof;

a restriction adjusting member mounted movably in a wall of said valve casing and including a tapered end movable relative to said valve port to define a restricted passageway for fluids with the adjacent walls of said valve port, said restricted passageway being of variable cross-sectional area settable to establish a predetermined fluid flow rate through the control valve located intermediate said fluid inlet and said outlet and thereby establishing first and second fluid pressures respectively on the upstream and downstream sides of said restricted passageway, a valve stem movable linearly within said casing and having valve means thereon cooperable with said valve port to regulate the flow of fluids therethrough in response to changes in fluid pressure differential, said valve stem having a valve plug at the lower end thereof cooperable with said valve port at the side thereof opposite from said restriction adjusting member, said restriction adjusting member being movable to establish a predetermined cross-sectional flow area for said restricted passageway for fluids, a spring case mounted on said valve casing extending outwardly thereof to enclose the upper portion of said valve stem, diaphragm means operatively connected to said valve stem and separating a region within said valve casing into a pair of pressure-differential chambers, said diaphragm being a bellows-diaphragm the peripheral edge of which is positioned between said valve casing and a flange integral with said spring case to thereby provide one pressure-differential chamber thereabove and another pressure-differential chamber therebelow, and means comprising a flow passage formed in said casing and spring case communicating said one pressure-differential chamber with said inlet chamber, said other pressure-differential chamber communicating with the downstream side of said valve port.

2. An automatic fluid control valve according to claim 1 including a spring within said spring case operatively connected to said valve stem so as to bias same outwardly of said valve casing and thereby said valve plug away from said valve port.

* * * * *